US009831935B2

(12) United States Patent
Song et al.

(10) Patent No.: US 9,831,935 B2
(45) Date of Patent: Nov. 28, 2017

(54) METHOD AND DEVICE FOR IMPROVING PERFORMANCE OF ANTENNA

(71) Applicant: Samsung Electronics Co., Ltd., Gyeonggi-do (KR)

(72) Inventors: Seong Jun Song, Seoul (KR); Jin Kyung Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 14/560,542

(22) Filed: Dec. 4, 2014

(65) Prior Publication Data

US 2015/0162972 A1    Jun. 11, 2015

(30) Foreign Application Priority Data

Dec. 5, 2013 (KR) .................. 10-2013-0150854

(51) Int. Cl.
*H04B 7/12* (2006.01)
*H04B 7/08* (2006.01)
*H04B 1/00* (2006.01)

(52) U.S. Cl.
CPC ............ *H04B 7/12* (2013.01); *H04B 1/0064* (2013.01); *H04B 7/0837* (2013.01)

(58) Field of Classification Search
CPC ....... H04B 7/12; H04B 1/0064; H04B 7/0837
See application file for complete search history.

(56) References Cited

U.S. PATENT DOCUMENTS

| 6,044,254 | A | * | 3/2000 | Ohta | ............... H04B 7/0894 455/272 |
|---|---|---|---|---|---|
| 7,606,553 | B2 | | 10/2009 | Konaka | |
| 7,800,553 | B2 | | 9/2010 | Konaka | |
| 9,490,548 | B2 | * | 11/2016 | Weissman | ............... H01Q 3/26 |
| 2006/0030278 | A1 | | 2/2006 | Konaka | |
| 2006/0165022 | A1 | * | 7/2006 | Nast | ............... H04B 1/18 370/310 |
| 2007/0046544 | A1 | * | 3/2007 | Murofushi | ............... H01Q 1/22 343/700 MS |
| 2008/0119231 | A1 | * | 5/2008 | Kim | ............... H04B 1/18 455/562.1 |
| 2008/0224943 | A1 | | 9/2008 | Konaka | |
| 2008/0253345 | A1 | * | 10/2008 | Sanguinetti | ............... H01Q 1/2291 370/339 |

(Continued)

*Primary Examiner* — Andrew Wendell
*Assistant Examiner* — Maryam Soltanzadeh
(74) *Attorney, Agent, or Firm* — The Farrell Law Firm, P.C.

(57) ABSTRACT

A method of communicating with a plurality of bands by using an electronic device including a plurality of antennas, an antenna system, and an electronic device is provided. The method includes providing a first or second band signal received via a first antenna to a first transceiver; receiving a first diversity signal for the second band signal via a second antenna and providing the received first diversity signal to a combiner via a signal divider connected to a second transceiver and the combiner; receiving a second diversity signal for the second band signal via a third antenna and providing the received second diversity signal to the combiner; and combining the first diversity signal and the second diversity signal in the combiner and providing the combined signal to a third transceiver connected to the third antenna.

15 Claims, 17 Drawing Sheets

(56) References Cited

U.S. PATENT DOCUMENTS

2012/0155334 A1* 6/2012 Kenington ........... H04B 7/0837
370/277
2012/0207235 A1* 8/2012 Pan ....................... H04B 17/11
375/267

* cited by examiner

METHOD AND DEVICE FOR IMPROVING PERFORMANCE OF ANTENNA

PRIORITY

This application claims priority under 35 U.S.C. §119(a) to a Korean Patent Application filed on Dec. 5, 2013 in the Korean Intellectual Property Office and assigned Serial No. 10-2013-0150854, the entire contents of which are incorporated herein by reference.

BACKGROUND

1. Field of the Invention

The present invention relates to a method and device for improving the performance of an antenna, and more particularly, to a method and device for improving the performance of an antenna that communicates in a plurality of bands.

2. Background of the Invention

A wireless communication electronic device has become one of the most essential electronic devices in to people. Especially since communication speed and data processing speed has improved rapidly in recent years, and a User Equipment (UE), such as a smartphone which provides a user functionality beyond web surfing, has formed the mainstream of a wireless communication electronic device.

A wireless communication electronic device essentially includes an antenna in order to perform wireless communication. An antenna for receiving a diversity signal may be realized in the electronic device. However, it is difficult for an electronic device such as a current smartphone to improve diversity radiation performance due to constrains such as an earphone jack at the upper end of the electronic device, a front camera, a rear camera decoration or deco, a receiver, and a front sensor.

Moreover, telecommunications carriers receive a predetermined frequency band in order to provide Long Term Evolution (LTE) service. During this process, due to various strategic/policy reasons, an adjustment to an original frequency band that a telecommunications carrier uses may be made. For example, if an existing LTE Band 3 1700 Channel (CH) (i.e., a center frequency of 1700CH is 1855.0 MHz) frequency band (Down Link (DL) 10 MHz) for LTE Band 3 (B3) service is returned and a LTE B3 1350CH (i.e., a center frequency of 1350CH is 1820.0 MHz) frequency band (DL 20 MHz) is assigned, a band used for LTE B3 service by telecommunications carriers moves to a frequency band that is lower by 35 MHz than before.

However, in this case, a newly extended frequency band may not be covered by the radiation performance of an antenna mounted on an existing electronic device. This is described below with reference to FIG. 1.

FIG. 1 is a graph of a Voltage Standing Wave Ratio (VSWR) of a lower end antenna of a portable terminal. As shown in FIG. 1, an antenna system mounted in a terminal may support LTE B3 and Wideband Code Division Multiple Access (WCDMA) Band 1 (B1) frequency bands. That is, an antenna system is designed to obtain a broadband signal corresponding to 1800 MHz (i.e., LTE B3 band) and 2100 MHz (i.e., WCDMA B1 band). However, when a frequency band that a terminal device supports is changed, as mentioned above, in order to cover 1350CH band in addition to the existing band, while maintaining a bandwidth, a frequency band may need to be moved a frequency band to the left or a bandwidth may need to be extended to the left.

However, extending a bandwidth to the left (i.e., extending a bandwidth to a relatively lower frequency band) while maintaining an existing band may be impossible to do because of the structure of a terminal or an antenna. When a bandwidth moves to the left to satisfy LTE B3 1350CH Total Radiated Power (TRP) performance, it is expected that WCDMA B1 Total Isotropic Sensitivity (TIS) performance will deteriorate.

SUMMARY

The present invention has been made to address the above-mentioned problems and disadvantages, and to provide at least the advantages described below. Accordingly, an aspect of the present provides a method and device for improving the radiation performance of an antenna.

In accordance with an aspect of the present invention, provided is a method of communicating with a plurality of bands by using an electronic device including a plurality of antennas. The method includes providing a first or second band signal received via a first antenna to a first transceiver; receiving a first diversity signal for the second band signal via a second antenna and providing the received first diversity signal to a combiner via a signal divider connected to a second transceiver and the combiner; receiving a second diversity signal for the second band signal via a third antenna and providing the received second diversity signal to the combiner; and combining the first diversity signal and the second diversity signal in the combiner and providing the combined signal to a third transceiver connected to the third antenna.

In accordance with another aspect of the present invention, provided is an antenna system for an electronic device communicating with a plurality of bands. The antenna system includes a first antenna and a first transceiver configured to receive a first band signal or a second band signal; a second antenna and a second transceiver configured to receive a first diversity signal for the second band signal; a third antenna and a third transceiver configured to receive a second diversity signal for the second band; a signal divider connected between the second antenna and the second transceiver; and a combiner connected between the third antenna and the third transceiver, wherein the signal divider is configured to deliver the first diversity signal to the combiner; and the combiner is configured to combine the first diversity signal and the second diversity signal and provide the combined signal to the third transceiver.

In accordance with another aspect of the present invention, provided is an electronic device for wireless communication for receiving signals of a first band and a second band. The electronic device includes a processor; a plurality of antennas; a plurality of transceivers respectively corresponding to the plurality of antennas; a signal divider configured to deliver a signal received by at least one antenna of the plurality of antennas to at least one of the plurality of transceivers or a combiner; and the combiner configured to combine at least two diversity signals for the second band.

BRIEF DESCRIPTION OF THE DRAWINGS

The foregoing and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1:
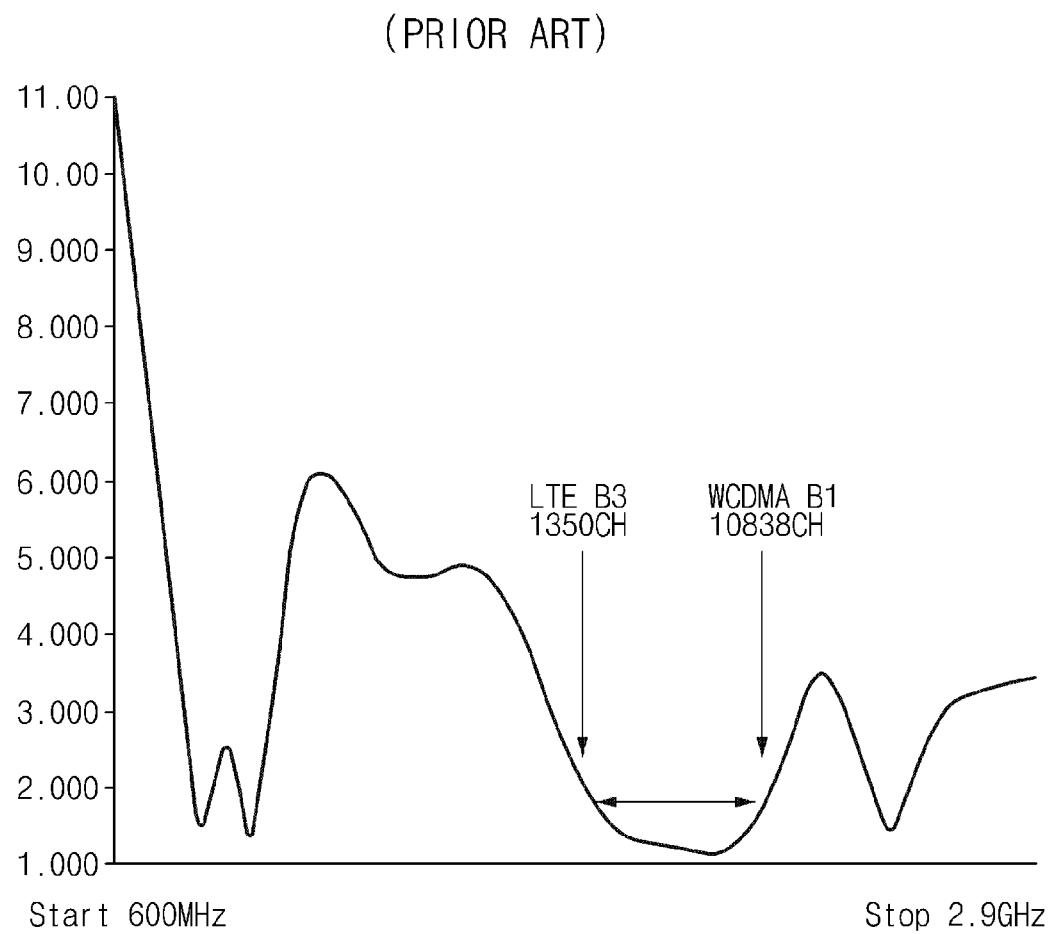
FIG. 1 is a graph of a VSWR of a lower end antenna of an SHV-E330S portable terminal.

Hereinafter, the present disclosure is described with reference to the accompanying drawings. Various modifications are possible in various embodiments of the present invention and embodiments are illustrated in drawings and related detailed descriptions are listed. Thus, it is intended that the present invention covers modifications and variations of this invention provided they come within the scope of the appended claims and their equivalents. With respect to the descriptions of the drawings, like reference numerals refer to like elements.

The terms "include," "comprise," and "have", or "may include," or "may comprise" and "may have" used herein indicate disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

The terms such as "1st", "2nd", "first", "second", and the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For example, a first component may be referred to as a second component and vice versa without departing from the scope of the present invention.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present invention and are not intended to limit the scope of the present invention. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present invention.

An electronic device according to various embodiments of the present invention may have a communication function. For instance, electronic devices may include at least one of smartphones, tablet Personal Computers (PCs), mobile phones, video phones, electronic book (e-book) readers, desktop PCs, laptop PCs, netbook computers, Personal Digital Assistants (PDAs), Portable Multimedia Players (PMPs), Moving Picture Experts Group Audio Layer 3 (MP3) players, mobile medical devices, cameras, and wearable devices (e.g., Head-Mounted-Devices (HMDs) such as electronic glasses, electronic apparel, electronic bracelets, electronic necklaces, electronic accessories, electronic tattoos, and smart watches).

According to some embodiments of the present invention, an electronic device may be smart home appliances having a communication function. The smart home appliances may include at least one of, for example, televisions, Digital Video Disk (DVD) players, audio devices, refrigerators, air conditioners, cleaners, ovens, microwave ovens, washing machines, air cleaners, set-top boxes, N boxes (e.g., Samsung HomeSync™, Apple TV™ or Google TV™), game consoles, electronic dictionaries, electronic keys, camcorders, and electronic picture frames.

According to embodiments of the present invention, an electronic device may include at least one of various medical devices (for example, Magnetic Resonance Angiography (MRA) devices, Magnetic Resonance Imaging (MRI) devices, Computed Tomography (CT) devices, medical imaging devices, ultrasonic devices, etc.), navigation devices, Global Positioning System (GPS) receivers, Event Data Recorders (EDRs), Flight Data Recorders (FDRs), vehicle infotainment devices, marine electronic equipment (for example, marine navigation systems, gyro compasses, etc.), avionics, security equipment, car head units, industrial or household robots, financial institutions' Automated Teller Machines (ATMs), and stores' Point Of Sale (POS) systems.

According to an embodiment of the present invention, an electronic device may include at least one of furniture or buildings/structures having a communication function, electronic boards, electronic signature receiving devices, projectors, or various measuring instruments (for example, water, electricity, gas, or radio signal measuring instruments). An electronic device according to an embodiment of the present invention may be one of the above-mentioned various devices or a combination thereof. Additionally, an electronic device according to an embodiment of the present invention may be a flexible device. Furthermore, it is apparent to those skilled in the art that an electronic device according to an embodiment of the present invention is not limited to the above-mentioned devices.

Hereinafter, an electronic device according to various embodiments of the present invention will be described in more detail with reference to the accompanying drawings. The term "user" in various embodiments may refer to a person using an electronic device or a device using an electronic device (for example, an artificial intelligent electronic device).

Figure 2A:
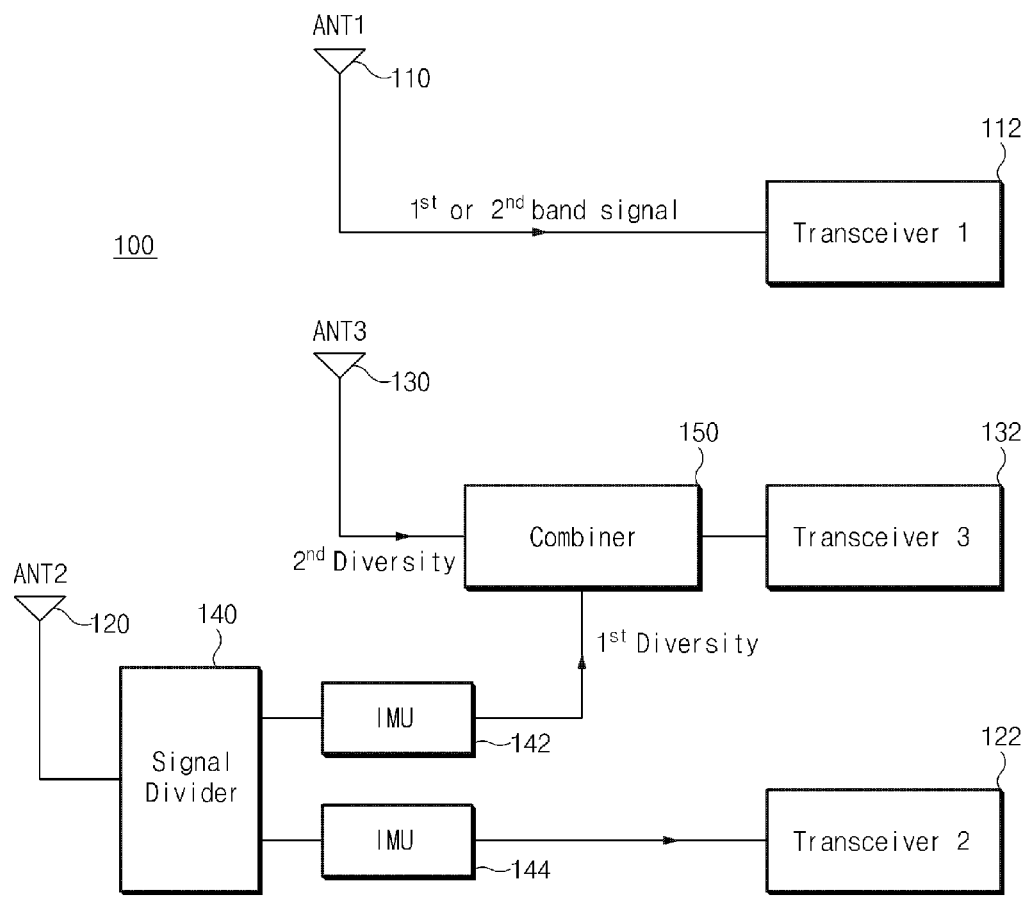
FIG. 2A is a block diagram of an antenna system according to an embodiment of the present invention.

FIG. 2A is a block diagram of an antenna system according to an embodiment of the present invention.

Referring to FIG. 2A, the antenna system 100 includes a first antenna 110 and a first transceiver 112, a second antenna 120 and a second transceiver 122, a third antenna 130 and a third transceiver 132, a signal divider 140, a first Impedance Matching Unit (IMU) 142, a second IMU 144, and a combiner 150.

The first antenna 110 is connected to the first transceiver 112. The first antenna 110 receives at least one band signal. That is, the first antenna 110 may receive a first band signal or a second band signal. Herein, a band means a frequency band used for WCDMA and/or LTE communication and does not distinguish a duplex mode. That is, the band does not distinguish a Frequency Division Duplex (FDD) mode from a Time Division Duplex (TDD) mode and a communication in a frequency band may be understood as a communication using a corresponding band.

For example, the first antenna 110 receives a signal in Band 3 (B3, 1800 MHz band) or Band 1 (B1, 2100 MHz band). As another example, especially in the case of China, the first antenna 110 receives a signal in Band 39 (i.e., B39, 1900 MHz band) and B1 or a signal in Band 40 (i.e., B40, 2300 MHz band) and B1. A signal received by the first antenna 110 is delivered to the first transceiver 112.

The second antenna 120 receives a first diversity signal for the second band and then provides it to the signal divider 140. Additionally, the third antenna 130 receives a second diversity signal for the second band and provides it to the combiner 150. Described below, the second antenna 120 may receive a diversity signal for the first band signal and the third antenna 130 may receive a diversity signal for the second band signal. That is, for example, the second antenna 120 may selectively receive a signal depending on the circumstances.

Typically, numbering for diversity may be applied based on an antenna device. For example, when the first antenna 110 receives a first band signal as main and each of the second antenna 120 and the third antenna 130 receives a diversity signal for the first band signal, the diversity signal received by the second antenna 120 may be defined as a second diversity signal and the diversity signal received by the third antenna 130 may be defined as a third diversity signal. That is, the first diversity signal may not be defined separately.

However, in the present invention, for convenience of description, a diversity signal is defined sequentially and used. That is, the first diversity is a diversity described first in a corresponding band and the second diversity is a diversity described second in a corresponding band. If it is not necessary to separate a diversity signal for a specific band, numbering is omitted.

Again, referring to FIG. 2A, the second antenna 120 receives a first diversity signal for the second band signal and then provides it to the signal divider 140. The signal divider 140 provides the first diversity signal for the second band signal to the combiner 150.

The signal divider 140 is connected to the second antenna 120, the second transceiver 122, and the combiner 150. Additionally, the signal divider 140 includes a first Impedance Matching Unit (IMU) 142 and a second IMU 144 for impedance matching between each connection section. As shown in FIG. 2A, the antenna system 100 includes the first IMU 142 disposed at a connection section between the signal divider 140 and the combiner 150 and the second IMU 144 disposed at a connection section between the signal divider 140 and the second transceiver 122.

The signal divider 140 may be configured with at least one type among a switch, a diplexer, a splitter, a di-multiplexer, and a Front End Module (FEM).

The combiner 150 combines the first and second diversity signals for the second band signal. The combined signal is provided to the third transceiver 132. The third transceiver 132 is connected to the third antenna 130 via the combiner 150.

When the antenna system 100 operates under a predetermined condition, for example, under a condition that does not require a signal to be radiated, the second antenna 120 operates as a diversity antenna for the first band (i.e., a first band DRX ANT). Simultaneously, the third antenna 130 may be understood as a diversity antenna for the second band (i.e., a second band DRX ANT). In this case, the second antenna 120 receives a diversity signal for a first band signal and then provides it to the second transceiver 122 via the signal divider 140.

Like the third antenna 130, the second antenna 120 operates as a diversity antenna for a second band. The first IMU 142 performs a role for moving the resonance point of the second antenna 120 to a frequency of a second band. When it is unnecessary to move the resonance point of the second antenna 120 to the frequency of the second band, the second antenna 120 receives a diversity signal of a first band via impedance matching by the second IMU 144. A condition for changing a signal received by the second antenna 120 is described below.

The first IMU 142 is disposed between the signal divider 140 and the combiner 150. By doing so, without a modification of the second antenna 120 and the second IMU 144, a resonance point may be moved and characteristics of the combiner 150 and line impedance characteristics between the signal dividers 140 are considered.

Additionally, a first diversity signal for the second band signal received by the second antenna 120 and a second diversity signal for the second band signal received by the third antenna 130, that is, an existing diversity antenna for the second band, are combined by the combiner 150.

Figure 2B:
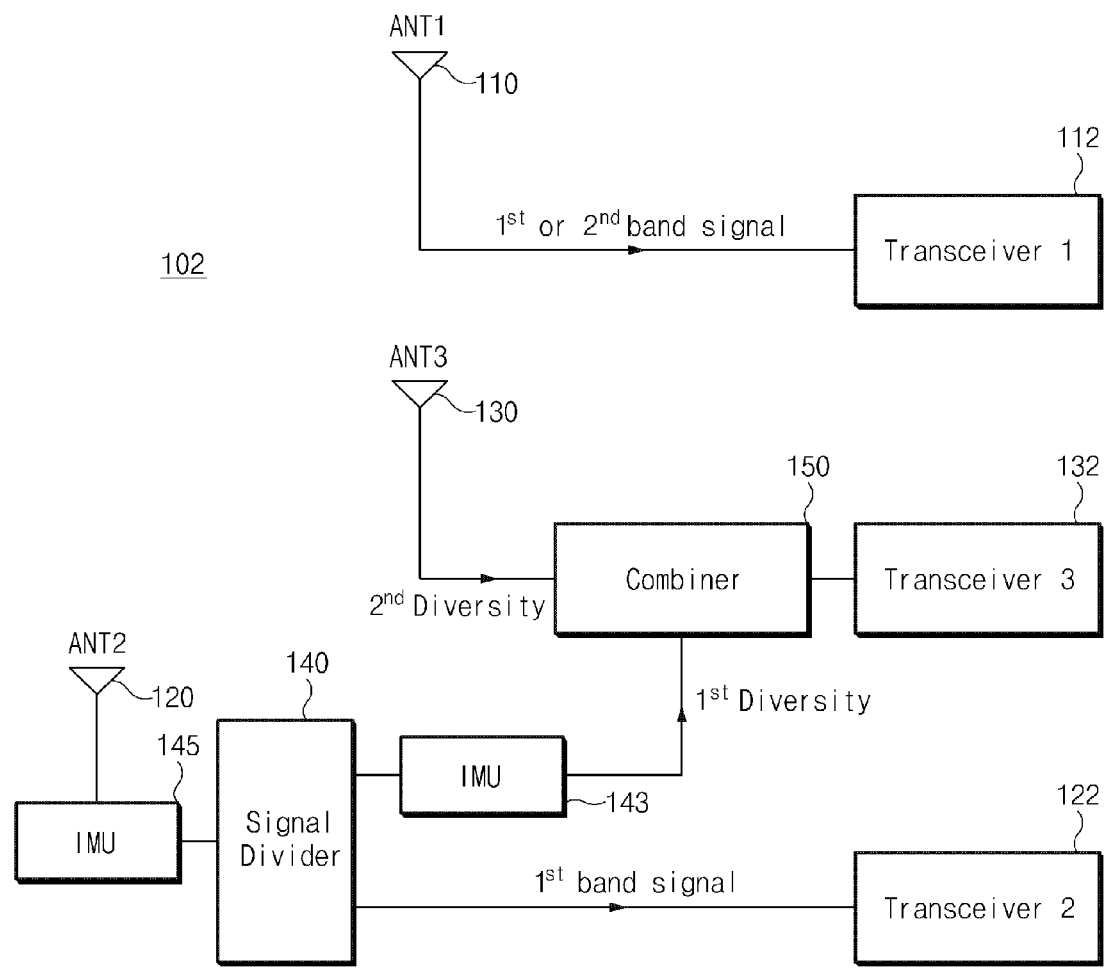
FIG. 2B is a block diagram of an antenna system according to an embodiment of the present invention.

FIG. 2B is a block diagram of an antenna system according to an embodiment of the present invention.

The antenna system 102 shown in FIG. 2B has a structure in which the position of the second IMU 144 in the antenna system 100 shown in FIG. 2A moves to between the second antenna 120 and the signal divider 140. In this case, structures of the first IMU 142 and the second IMU 144 or an impedance value of a component may change and be understood as first and second IMUs 143 and 145 shown in FIG. 2B, respectively. In addition to this, other components including an antenna device may be changed as well.

Typically, an impedance matching means may be positioned immediately next to the antenna. Accordingly, the structure of FIG. 2B may be used instead of the structure of FIG. 2A. However, while the size of a terminal device decreases, supporting functions increase continuously, and space for realizing an antenna in the terminal device decreases. Therefore, as shown in FIG. 2A, due to antenna characteristics and mechanical constraints, an IMU is not disposed between the second antenna 120 and the signal divider 140, but the signal divider 140 is disposed between the second antenna 120 and an IMU.

Figure 3A:
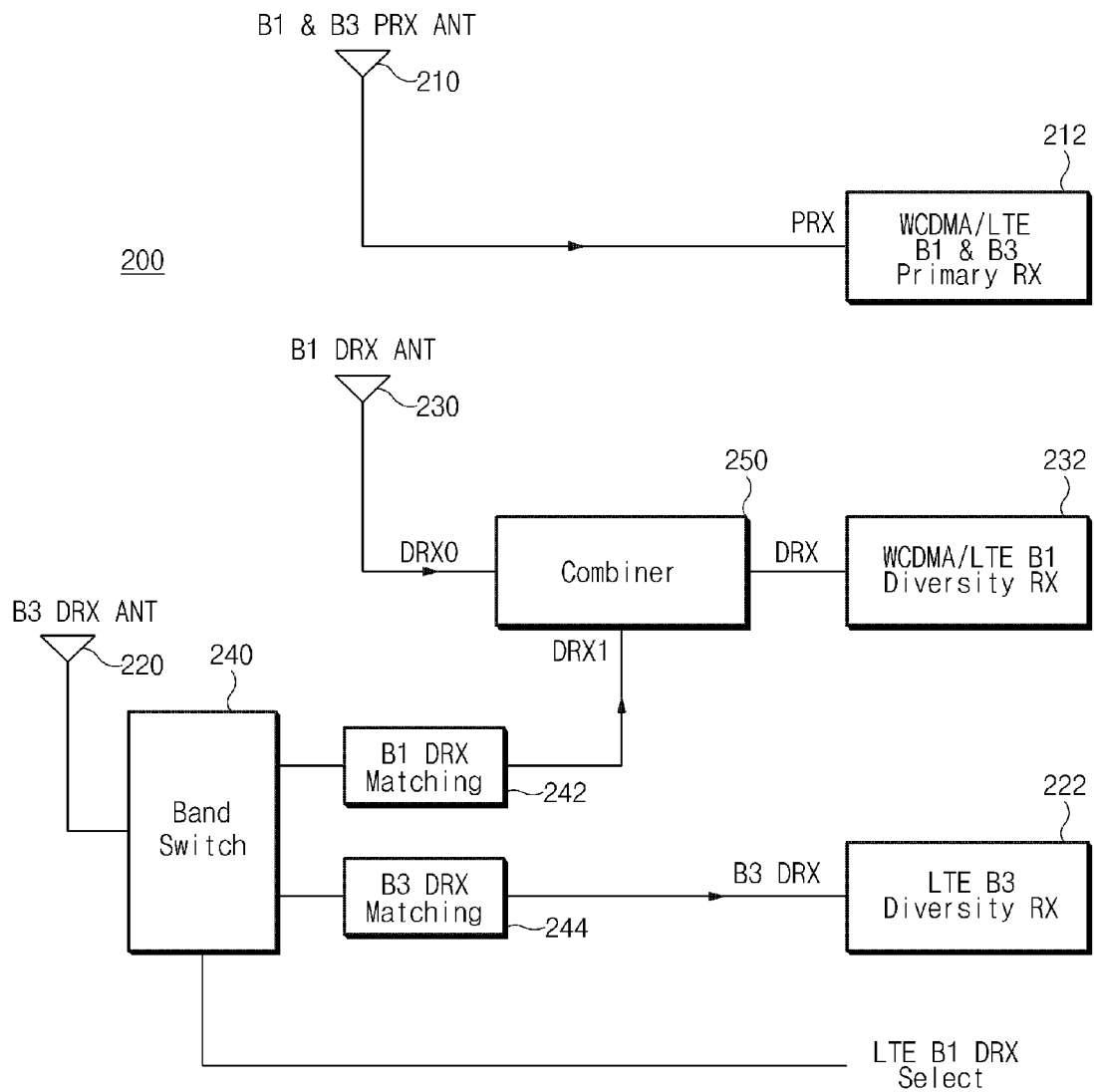
FIGS. 3A and 3B are block diagrams of antenna systems for receiving a signal in bands B1 and B3 according to embodiments of the present invention.
Figure 3B:
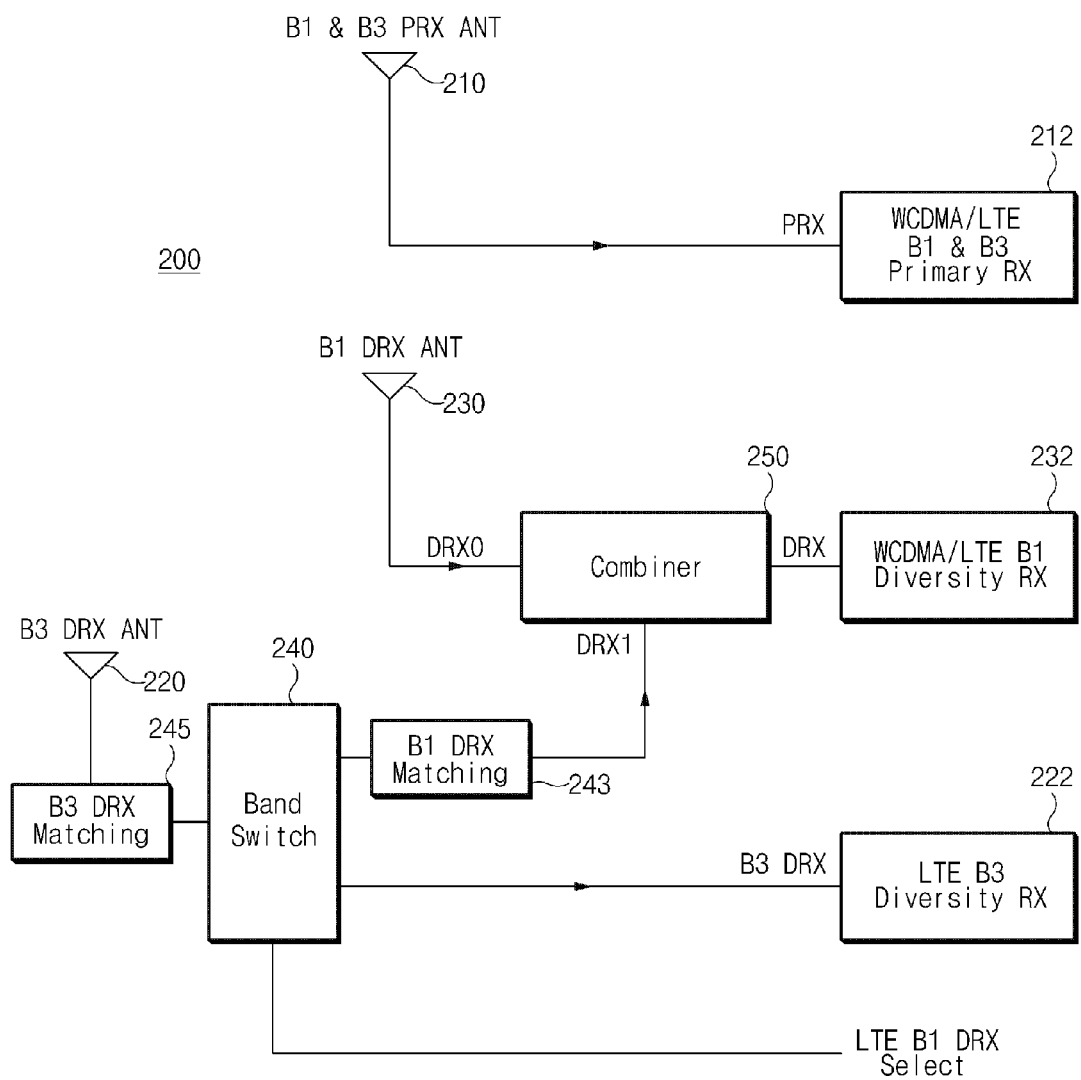

FIGS. 3A and 3B are block diagrams of antenna systems for receiving a signal in B1 and B3 bands according to embodiments of the present invention. FIG. 3A illustrates an antenna system 200 in which an impedance matching unit for B1 DRX matching 242 is disposed at a connection section between a band switch 240 and a passive combiner 250. FIG. 3B illustrates an antenna system 202 in which an impedance matching unit for B1 DRX matching 243 is disposed at a connection section between a B3 diversity antenna (i.e., B3 DRX ANT) 220 and the band switch 240. That is, it is understood that FIGS. 3A and 3B correspond to FIGS. 2A and 2B, respectively. Hereinafter, description is made with reference to FIG. 3A. However, description below may be applied to components of FIG. 3B in the same or corresponding way.

Referring to FIG. 3A, the main antenna 210 receives a signal in a B1 or B3 band and transmits it to a main receiver (e.g., WCDMA/LTE B1 & B3 Primary RX) 212. A B1 diversity antenna (e.g., B1 DRX ANT) 230 receives a diversity signal for B1 band signal DRX0 and provides it to a passive combiner 250. The B3 diversity antenna (i.e., B3 DRX ANT) 220 typically receives a diversity signal for B3 signal B3 DRX and provides it to an LTE B3 diversity receiver (i.e., LTE B3 Diversity RX) 222. In the description relating to FIGS. 3A and 3B, a "receiver (RX)" may be replaced with the transceiver shown in FIG. 2.

By a command for controlling the B3 DRX ANT 220 to receive a diversity signal for a B1 band signal, the band switch 240 allows the B3 DRX ANT 220 to receive a diversity signal DRX1 for a B1 band signal. In the opposite case, that is, when receiving a diversity signal B3 DRX for a B3 band signal, the band switch 240 disconnects the B1 DRX matching unit 242 to cause impedance matching by the B3 DRX matching unit 244. The band switch 240 is controlled in response to a command of a processor, especially, a Communication Processor (CP) or an Application Processor (AP).

The passive combiner 250 combines DRX0 and DRX1 to generate a DRX signal and provides it to the WCDMA/LTE B1 diversity RX 232.

The embodiments shown in FIGS. 2A, 2B, 3A, and 3B have the following meanings. In relation to a portable terminal that requires the support of both B3 and B1 bands, when it is expected that the antenna radiation performance of a WCDMA or LTE B1 band is deteriorated, the radiation performance of a B1 band may be improved by changing an antenna matching unit to use a B3 DRX antenna as a B1. DRX antenna and combining the obtained DRX signals to provide them to a transceiver.

Figure 4A:
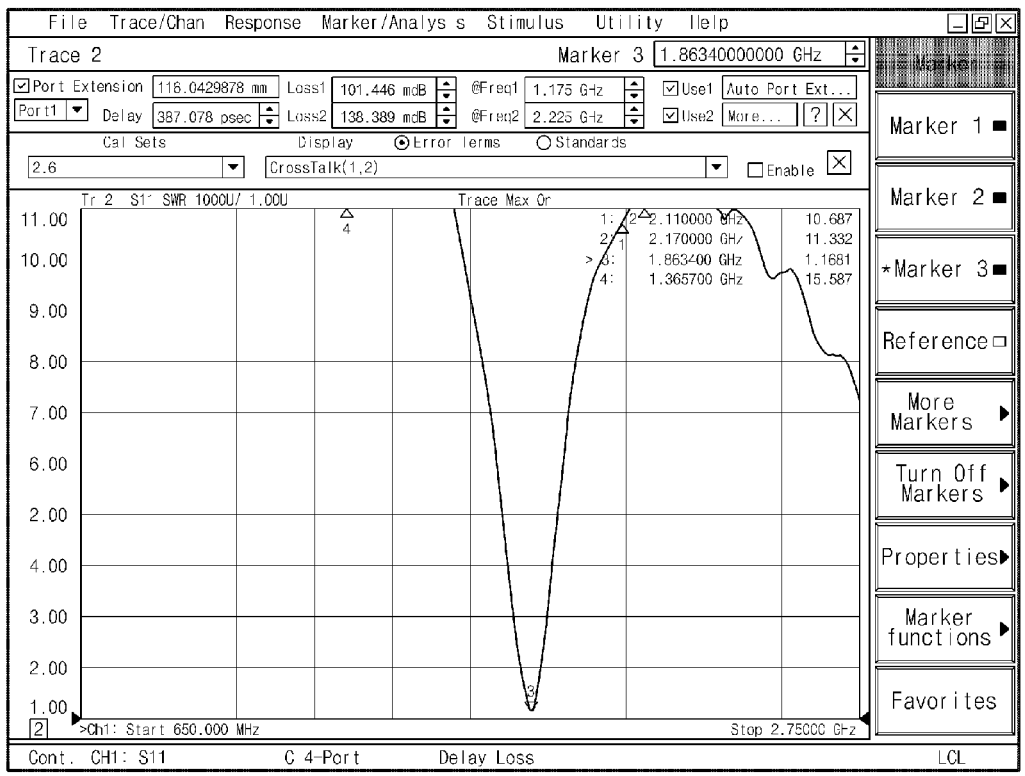
FIGS. 4A and 4B illustrate two VSWR measurement results of an antenna when a resonance point of a B3 Driver Receiver (DRX) antenna moves to a B1 frequency band according to an embodiment of the present invention.
Figure 4B:
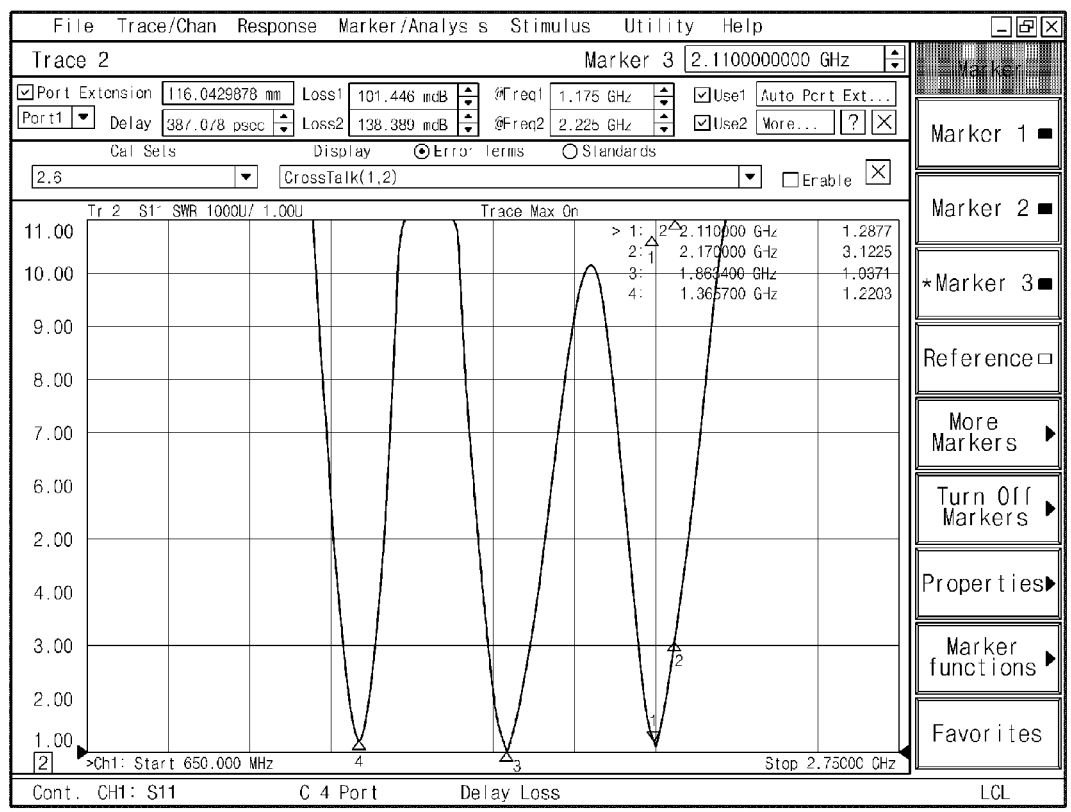

FIGS. 4A and 4B illustrates two VSWR measurement results of an antenna device obtained when the resonance point of a B3 DRX antenna moves to a B1 frequency band according to an embodiment of the present invention.

Specifically, FIG. 4A shows a VSWR measurement result of an original antenna device and FIG. 4B shows a VSWR measurement result after the resonance point of the B3 DRX antenna moves to a B1 frequency band. The first VSWR has a resonance point at 1.86 GHz. This corresponds to Band 3. On the other hand, a resonance point is provided at 2.11 GHz in the bottom graph. This corresponds to Band 1. Unnecessary resonance points may be removed via filtering.

As understood with reference to FIGS. 2A, 2B, 3A, and 3B, a modification on an antenna for moving a resonance point is not necessary. That is, tasks for changing the length or shape of an antenna or adding a feeder pattern or a coupling pattern are not required. Only a structure and/or time constant change of the first and second IMUs 142 and 144 is required. In that an antenna pattern does not need to change, this brings effects of frequency band changes and radiation performance improvements via changes in a circuit pattern, a capacitor, an inductance, and/or a resistance value, while maintaining the internal structure of an existing terminal.

Figure 5:
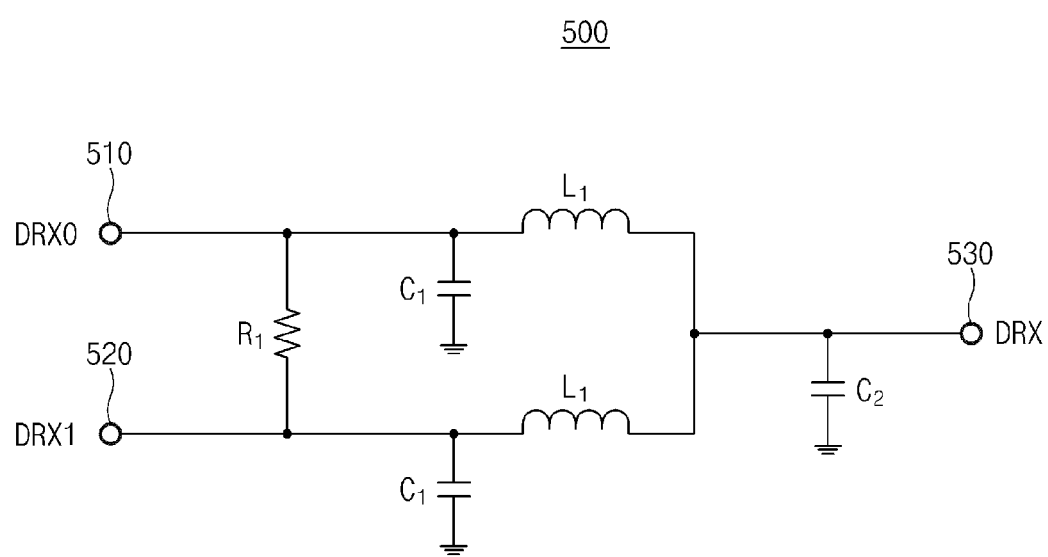
FIG. 5 is a schematic diagram of a combiner according to an embodiment of the present invention.

FIG. 5 is a schematic diagram of a combiner according to an embodiment of the present invention.

Referring to FIG. 5, the combiner 500 (e.g., the combiner 150, or 250) includes at least one resistor R1, capacitor C1, and inductance L1. The combiner 500 includes at least two terminals where a diversity signal received from an antenna is inputted. For example, a DRX0 terminal 510 may be a terminal where a second diversity signal for a second band signal received by the third antenna 130 is inputted as shown in FIGS. 2A and 2B or may be a terminal where a diversity signal DRX0 for B1 band signal received by the B1 DRX ANT 230 is inputted as shown in FIGS. 3A and 3B. Additionally, a DRX1 terminal 520 may be a terminal where a first diversity signal for a second band signal received by the second antenna 120 is inputted via the signal divider 140 as shown in FIGS. 2A and 2B or may be a terminal where a diversity signal DRX1 for a B1 band signal received by the B3 DRX ANT 220 is inputted as shown in FIGS. 3A and 3B.

The combiner 500 includes a DRX terminal 530 for outputting a combined signal. The DRX terminal 530 transmits the combined signal of FIGS. 2A and 2B to the third transceiver 132 or to the B1 diversity receiver 232 of FIGS. 3A and 3B.

The combiner 500 has a Resistor-Inductor-Capacitor (RLC) passive structure in which a mounting area is small and a Printed Circuit Board (PCB) of a terminal is implementable. The input signals DRX0 510 and DRX1 520 are power-combined and outputted to the DRX terminal 530. R1 may be 100Ω, and C2 may have a value twice a time constant value of C1. A simulation result of an antenna system using such a passive combiner is shown in FIGS. 6A-6D.

Figure 6A:
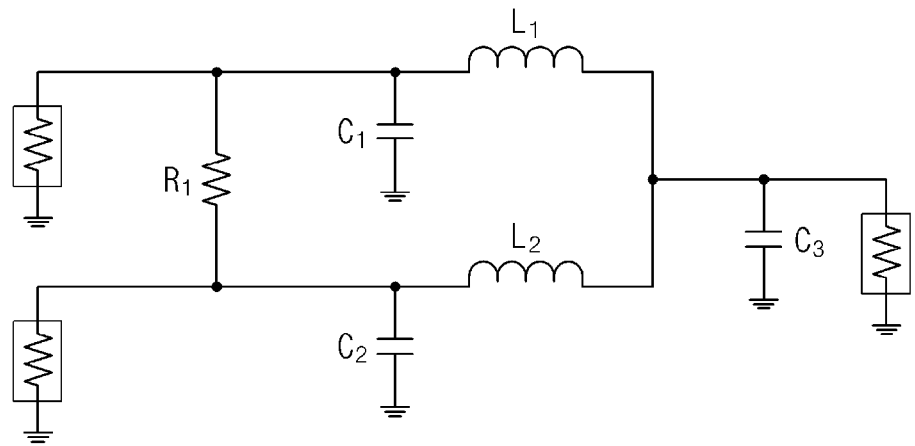
FIGS. 6A-6D illustrate a verification result of an antenna system in LTE B3 band according to an embodiment of the present invention.
Figure 6B:
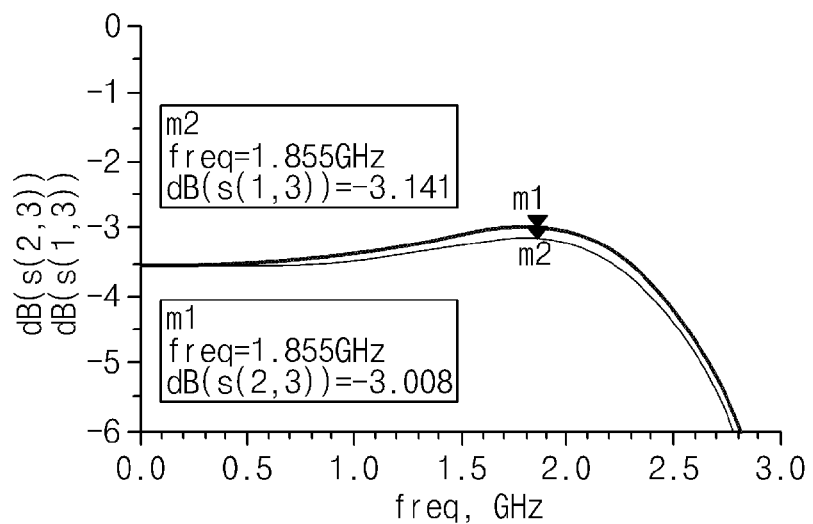
Figure 6C:
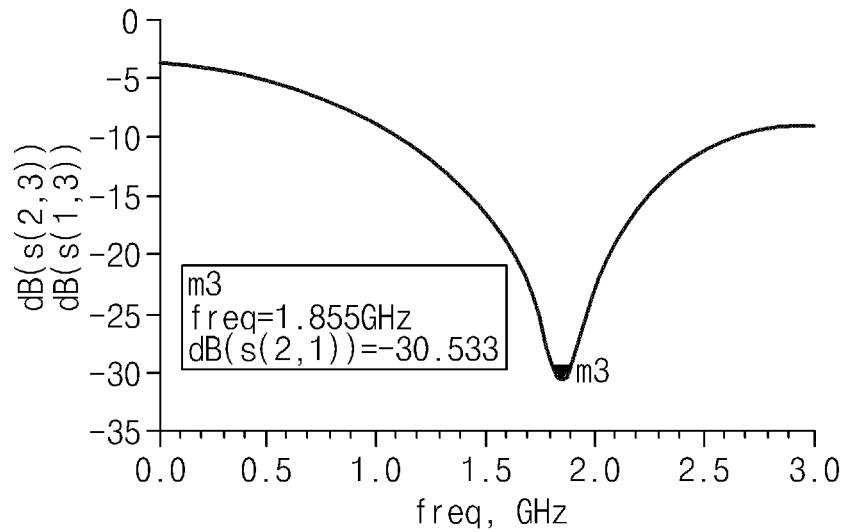
Figure 6D:
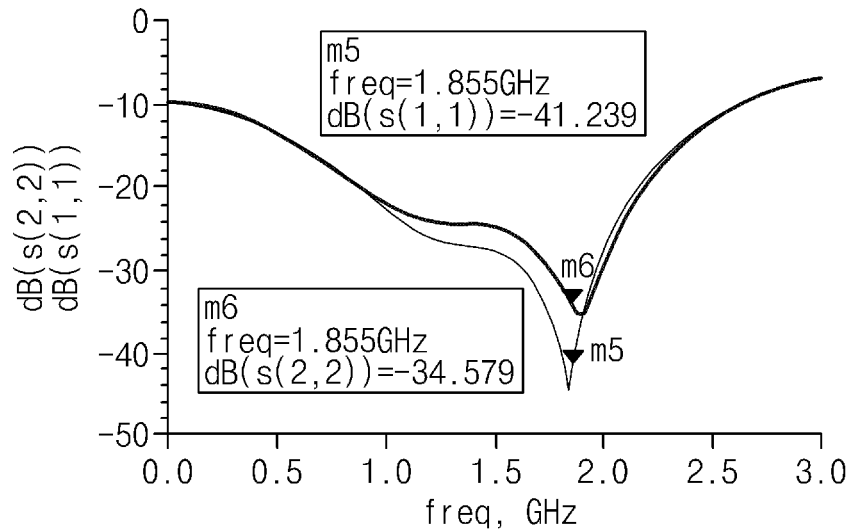

FIGS. 6A-6D illustrate a verification result of an antenna system in LTE B3 band according to an embodiment of the present invention. The verification is performed by using the Advanced Design System (ADS) Simulation Tool. FIG. 6A is a schematic diagram of a combiner corresponding to the passive combiner 500 shown in FIG. 5. FIG. 6B is an illustration of insertion loss. FIG. 6C is an illustration of coupling loss. FIG. 6D is an illustration of return loss.

Referring to FIGS. 6A-6D, it is shown that the characteristics of the coupling loss and the return loss are excellent. However, since the combiner 500 is configured with a passive device, the insertion loss is about 3 dB to about 4 dB. A combiner for compensating for this loss is shown in FIG. 7.

Figure 7:
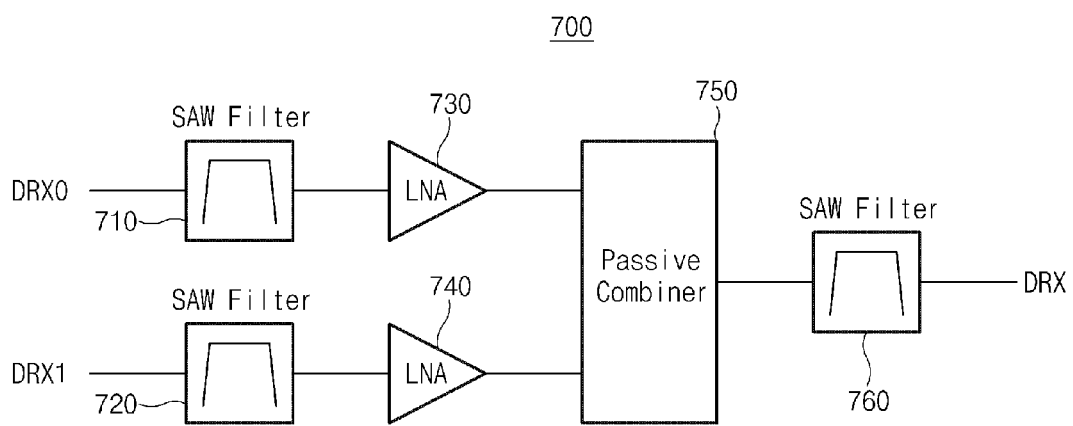
FIG. 7 is a schematic diagram of a combiner for compensating for insertion loss according to an embodiment of the present invention.

FIG. 7 is a schematic diagram of a combiner 700 for compensating for insertion loss according to an embodiment of the present invention.

Referring to FIG. 7, Low Noise Amplifiers (LNAs) 730 and 740 are connected to the input terminals of the passive combiner 150, 250 for inputting each diversity signal. Surface Acoustic Wave (SAW) filters 710 and 720 are connected to the inputs of the LNAs 730 and 740, respectively, where the inputs of the SAW filters 710, 720 are the DRX0 and DRX1 inputs to the combiner 700, respectively. Additionally, a SAW filter 760 is connected to the output terminal of the combiner 750, where the output of the SAW filter 760 is DRX. In order to distinguish each SAW filter, a SAW filter disposed at an input terminal may be understood as a pre-SAW filter and a SAW filter disposed at an output terminal may be understood as a post-SAW filter.

Referring to FIG. 2A, 2B, 3A, or 3B, the LNA 730 shown in FIG. 7 is connected to the third antenna 130 or 230. The LNA 740 is connected to the second antenna 120 or 220 via the signal divider 140 or the band switch 240. That is, the LNA 730 or 740 becomes a first block next to the antenna substantially and amplifies a signal to a proper level for processing the received first and second diversity signals for a second band signal. Since the reception sensitivity of an entire antenna system is determined via signal processing by an LNA, this process is very important. An operation where first and/or second diversity signals pass via an LNA may be controlled by a processor of an electronic device equipped in an antenna system. An electronic device including an antenna system according to an embodiment of the present invention is described with reference to FIG. 8.

Figure 8:
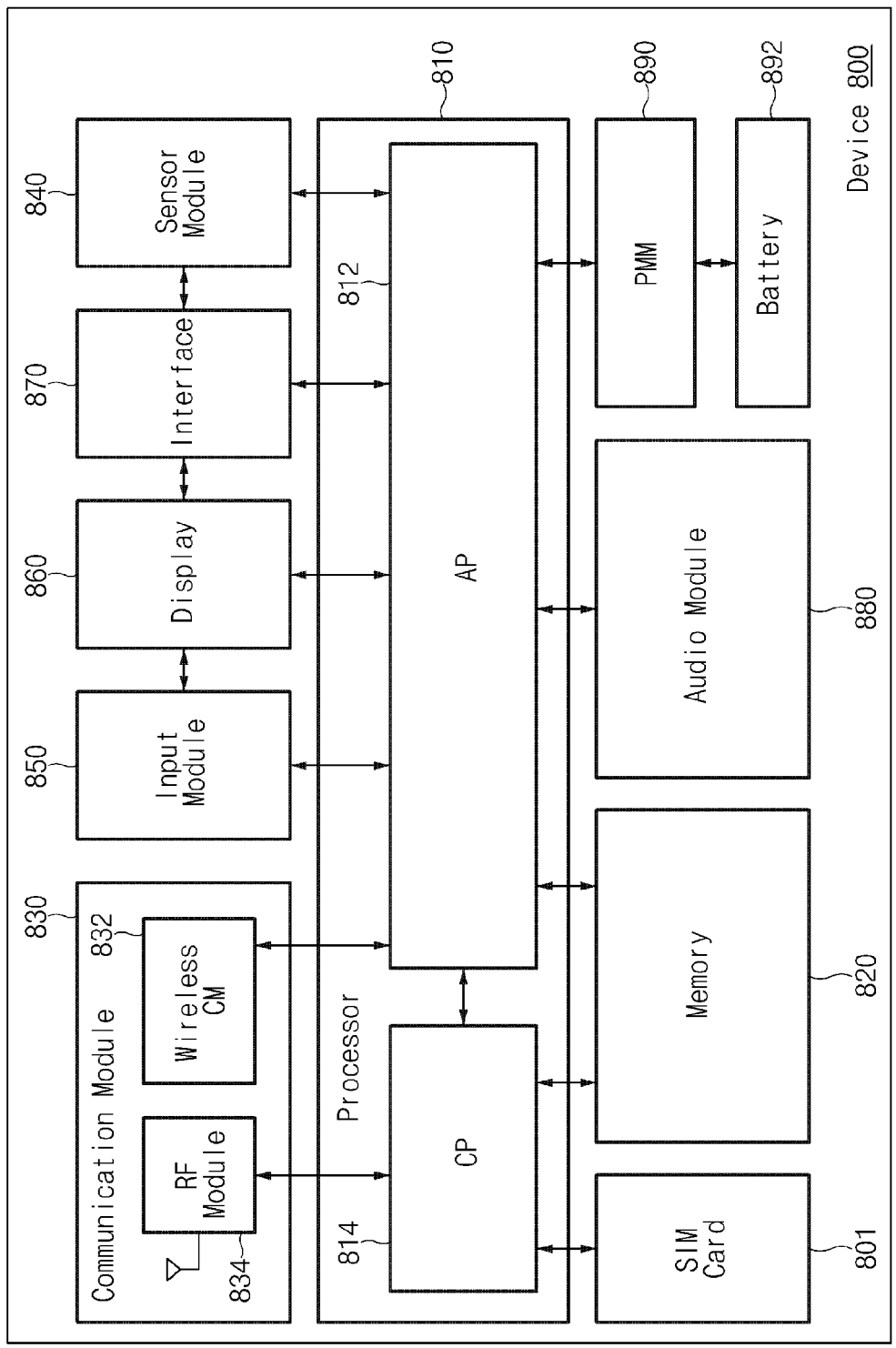
FIG. 8 is a block diagram of an electronic device including an antenna system according to an embodiment of the present invention.

FIG. 8 is a block diagram of an electronic device including an antenna system according to an embodiment of the present invention.

Referring to FIG. 8, the electronic device 800 includes a processor 810, a memory 820, a communication module 830, a sensor module 840, an input module 850, a display 860, an interface 870, an audio module 880, a Power Management Module (PMM) 890, a battery 892, and a SIM card 801.

The processor 810 includes at least one Application Processor (AP) 812 and/or at least one Communication Processor (CP) 814. Although the AP 812 and the CP 814 are included in the processor 810 as shown in FIG. 8, they may be included in different Integrated Circuit (IC) packages. According to an embodiment of the present invention, the AP 812 and the CP 814 may be included in one IC package.

The AP 812 controls a plurality of hardware and software components connected to the AP 812 and performs various data processing and operations including multimedia data by executing operating systems or application programs. The AP 812 may be realized with System on Chip (SoC). According to an embodiment of the present invention, the processor 810 may further include a Graphics Processing Unit (GPU).

The CP 814 performs a function for managing a data link and converting a communication protocol in communication between other electronic devices connected via a network. The CP 814 may be realized with SoC. According to an embodiment of the present invention, the CP 814 performs at least part of a multimedia control function. The CP 814 performs the distinction and authentication of an electronic device in a communication network by using a Subscriber Identification Module (for example, the SIM card 801). Additionally, the CP 814 provides services to a user, for example, a voice call, a video call, Short Message Service (SMS), or packet data.

Additionally, the CP 814 controls the data transmission of the communication module 830. As shown in FIG. 8, components such as the CP 814, the Power Management Module 890, or the memory 820 are separated from the AP 812. However, according to an embodiment of the present invention, the AP may be realized including at least some (for example, the CP 814) of the above-mentioned components.

According to an embodiment of the present invention, the AP 812 or the CP 814 loads a command or data received from each connected non-volatile memory or another component into a volatile memory and then, processes it. Additionally, the AP 812 or the CP 814 stores in a non-volatile memory the data received from at least one component or generated by at least one component.

The SIM card 801 is a card that includes a Subscriber Identification Module and may be inserted into a slot formed at a position in an electronic device. The SIM card 801 includes unique identification information (for example, Integrated Circuit Card Identifier (ICCID)) or subscriber information (for example, International Mobile Subscriber Identity (IMSI)).

The memory 820 includes internal memory and/or external memory. The internal memory includes at least one of volatile memories such as Dynamic Random Access Memory (DRAM), Static RAM (SRAM), and Synchronous DRAM (SDRAM) and non-volatile memories such as One Time Programmable Read Only Memory (OTPROM), Programmable ROM (PROM), Erasable PROM (EPROM), Electrically Erasable PROM (EEPROM), mask ROM, flash ROM, NAND flash memory, and NOR flash memory. According to an embodiment of the present invention, the internal memory may be a Solid State Drive (SSD). The external memory may further include a flash drive such as a Compact Flash (CF) card, a Secure Digital (SD) card, a Micro-SD card, a Mini-SD card, an eXtreme Digital (XD) card, or a Memory Stick. The external memory may be functionally connected to the electronic device 800 via various interfaces. According to an embodiment of the present invention, the electronic device 800 further includes a storage device (or a storage medium) such as a Hard Disk Drive (HDD).

The communication module 830 includes a wireless communication module 832 and/or an RF module 834. The wireless communication module 832 may include Wireless Fidelity (Wi-Fi), Bluetooth, Global Positioning System (GPS), or Near Field Communication (NFC). The wireless communication module 832 provides a wireless communication function by using a wireless frequency. Additionally, the wireless communication module 832 may include a network interface (for example, a Local Area Network (LAN) card) or a modem for allowing the electronic device 800 to be connected to a network (for example, the Internet, a LAN, a Wide Area Network (WAN), a telecommunication network, a cellular network, a satellite network, or Plain Old Telephone Service (POTS)).

The RF module 834 is responsible for data communication such as the transmission of an RF signal. The RF module 834 may include a transceiver, a Power Amplifier Module (PAM), a frequency filter, or an LNA. Additionally, the RF module 834 may further include a component for transmitting/receiving electromagnetic waves on a free space, for example, a conductor or a conductive wire. According to an embodiment of the present invention, an antenna system may correspond to the RF module 834 or at least part of the components configuring the RF module 834.

The sensor module 840 measures a physical quantity or detects an operating state of the electronic device 800 and then converts measured or detected information into electrical signals. The sensor module 740 includes at least one of a gesture sensor, a gyro sensor, a pressure sensor, a magnetic sensor, an acceleration sensor, a grip sensor, a proximity sensor, a color sensor (for example, a Red-Green-Blue (RGB) sensor), a bio sensor, a temperature/humidity sensor, an illumination sensor, or an Ultra Violet (UV) sensor. Additionally, the sensor module 840 may include an olfactory sensor, an ElectroMyoGraphy (EMG) sensor, an ElectroEncephaloGram (EEG) sensor, an ElectroCardioGram (ECG) sensor, an InfraRed (IR) sensor, an iris sensor, or a fingerprint sensor. The sensor module 840 further includes a control circuit for controlling at least one sensor.

The input module 850 may include a touch panel, a (digital) pen sensor, a key, or an ultrasonic input device. The touch panel recognizes a touch input via at least one among capacitive, resistive, infrared and ultrasonic methods. Additionally, the touch panel further includes a control circuit. In the case of the capacitive method, physical contact or proximity recognition is possible. The touch panel may further include a tactile layer. In this case, the touch panel provides a tactile reaction to a user.

The display 860 may include a panel, a hologram, or a projector. For example, the panel may be a Liquid Crystal Display (LCD) or Active Matrix Organic Light-Emitting Diode (AMOLED). Additionally, the panel may be implemented to be flexible, transparent, or wearable. The panel and the touch panel may be configured as one module. The hologram shows 3D images in the air by using the interference of light. The projector displays images by projecting light onto a screen. The screen may be disposed inside/outside the electronic device 800. According to an embodiment of the present invention, the display 860 may further include a control circuit for controlling a panel, a hologram, or a projector.

The interface 870 may include High Definition Multimedia Interface (HDMI), Universal Serial Bus (USB), an optical communication terminal or a D-sub connector. The interface 870 may also include a Mobile High-definition Link (MHL), an SD card/Multi-Media Card (MMC) or an InfraRed Data Association (IrDA) port.

The audio module 880 converts sound and electrical signals bi-directionally. The audio module 880 processes sound information inputted or outputted via a speaker, a receiver, an earphone, or a microphone or mic.

The power management module 890 manages the power of the electronic device 800. The power management module 890 may include a Power Management Integrated Circuit (PMIC), a Charger Integrated Circuit (IC), or a battery or fuel gauge.

The antenna system 100 or 200 and the combiner 150, 250 or 750 relating thereto described with reference to FIGS. 2A to 7 may be applied to the electronic device 800 shown in FIG. 8.

For example, the electronic device 800 may be an electronic device for receiving a plurality of band signals. In this case, the electronic device 800 may include a communication module 830 and a processor 810 for controlling it. The communication module 830 may include a plurality of antennas and for example, may include a first antenna for receiving a first or second band signal, a second antenna for receiving a diversity signal of a first band signal, and a third antenna for receiving a diversity signal of a second band signal. Additionally, the communication module 830 may include a transceiver corresponding to each antenna.

The communication module 830 includes a signal divider for delivering a signal received via at least one among a plurality of antennas to a corresponding transceiver among a plurality of transceivers or a combiner. In this case, the communication module 830 includes a combiner.

The combiner combines at least two diversity signals for a band signal. In the above-mentioned embodiment of the present invention, the third antenna receives a diversity signal of a second band signal. The second antenna receiving a diversity signal of a first band signal may receive a diversity signal of a second band signal. Such reception band switching is controlled by a processor. In more detail, the reception band switching is controlled by the CP 814 or the AP 812 in the processor 810.

For example, when an antenna device of a terminal supports a frequency band corresponding to B3 and B1 bands and the B1 band is required to additionally support a relatively low frequency domain, as an entire resonance point moves, the reception sensitivity may be deteriorated in the B1 frequency band. Accordingly, the processor 810 checks the Reference Signal Received Power (RSRP) of the B1 diversity signal (i.e., B1 DRX0) by the third antenna, or a Signal to Interference plus Noise Ratio (SINR), periodically, non-periodically, or in real time and then compares it with a predetermined reference value. If a corresponding parameter value is greater than a predetermined reference value (i.e., a threshold), that is, when there is a relatively weak electric field situation, the processor 810 controls the antenna system to allow the second antenna to receive the B1 diversity signal (i.e., B1 DRX1). The combiner combines a diversity signal received by the second antenna and a diversity signal received by the third antenna and provides the combined signal DRX to the transceiver. Therefore, the performance of the antenna may be improved.

Additionally, the antenna system may be implemented using a chip structure. For example, at least two transceivers may be mounted in one chip. Transceivers and other components in a chip may be determined depending on the inner structure of the electronic device 800, the size of the battery 892, the mounting position of the SIM card 801, the arrangement of the various sensor modules 840, and the antenna reception sensitivity according thereto.

Moreover, as mentioned above, the communication module 830 may include at least one among a SAW filter and an LNA between a signal divider and a combiner. Additionally, the communication module 830 may include a SAW filter between a combiner and a transceiver. A filtering operation by a SAW filter and an amplification operation by an LNA may be controlled by the processor 810, in more detail, the CP 814 or the AP 812.

Figure 9:
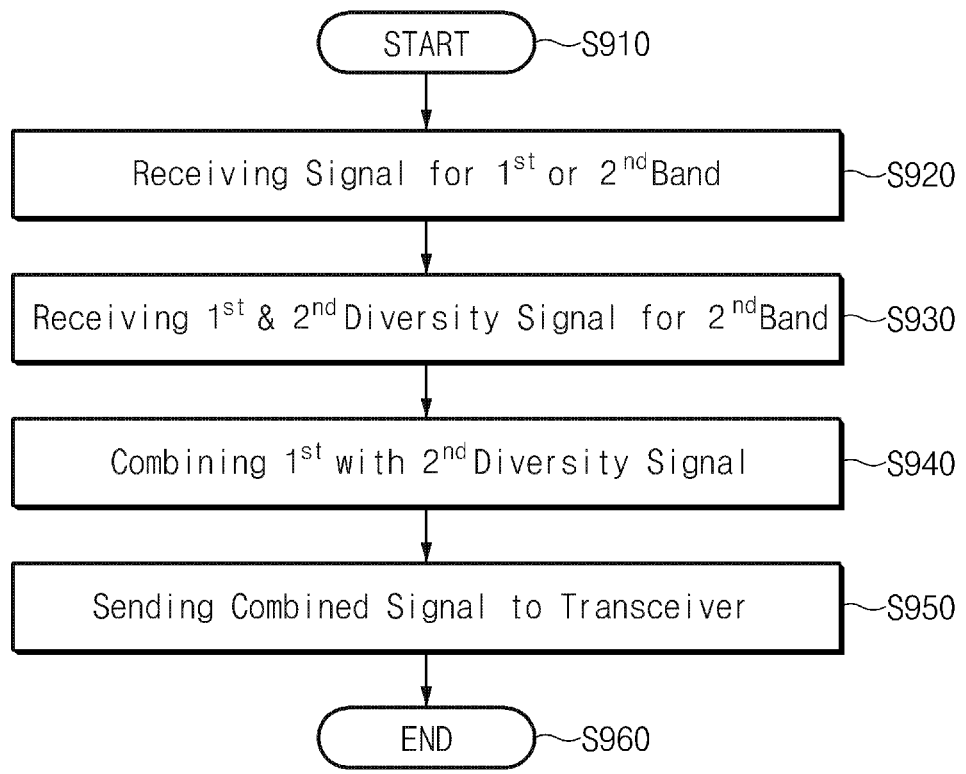
FIG. 9 is a flowchart of a method of generating a combined diversity signal according to an embodiment of the present invention.

FIG. 9 is a flowchart of a method of generating a combined diversity signal according to an embodiment of the present invention.

Referring to FIG. 9, the process starts in step S910. The process described below may be performed on the antenna systems 100, 102, 200, and 202 and the electronic device 800. Of course, the process described below may be performed on a device or an antenna system appropriate for performing the process and is not limited to the above. In the description below, a description of the portions overlapping/corresponding to the above-mentioned contents is omitted.

In step S920, a signal for a first or second band is received. Step S920 is performed by the first antenna. In step S930, a first diversity signal for a second band and a second diversity signal for the second band are received. The first diversity signal may be received by the second antenna and the second diversity signal may be received by the third antenna.

In step S940, the received first and second diversity signals are combined. The combined signal is generated by a combiner. By receiving and combining an additional diversity signal for the second band, the antenna performance for the second band may be improved.

The combined signal is provided to a transceiver in step S950. The transceiver is a transceiver (i.e., a third transceiver) corresponding to a third antenna. The signal provided to the transceiver is demodulated and used in a terminal device. In step S960, the method is terminated.

Figure 10:
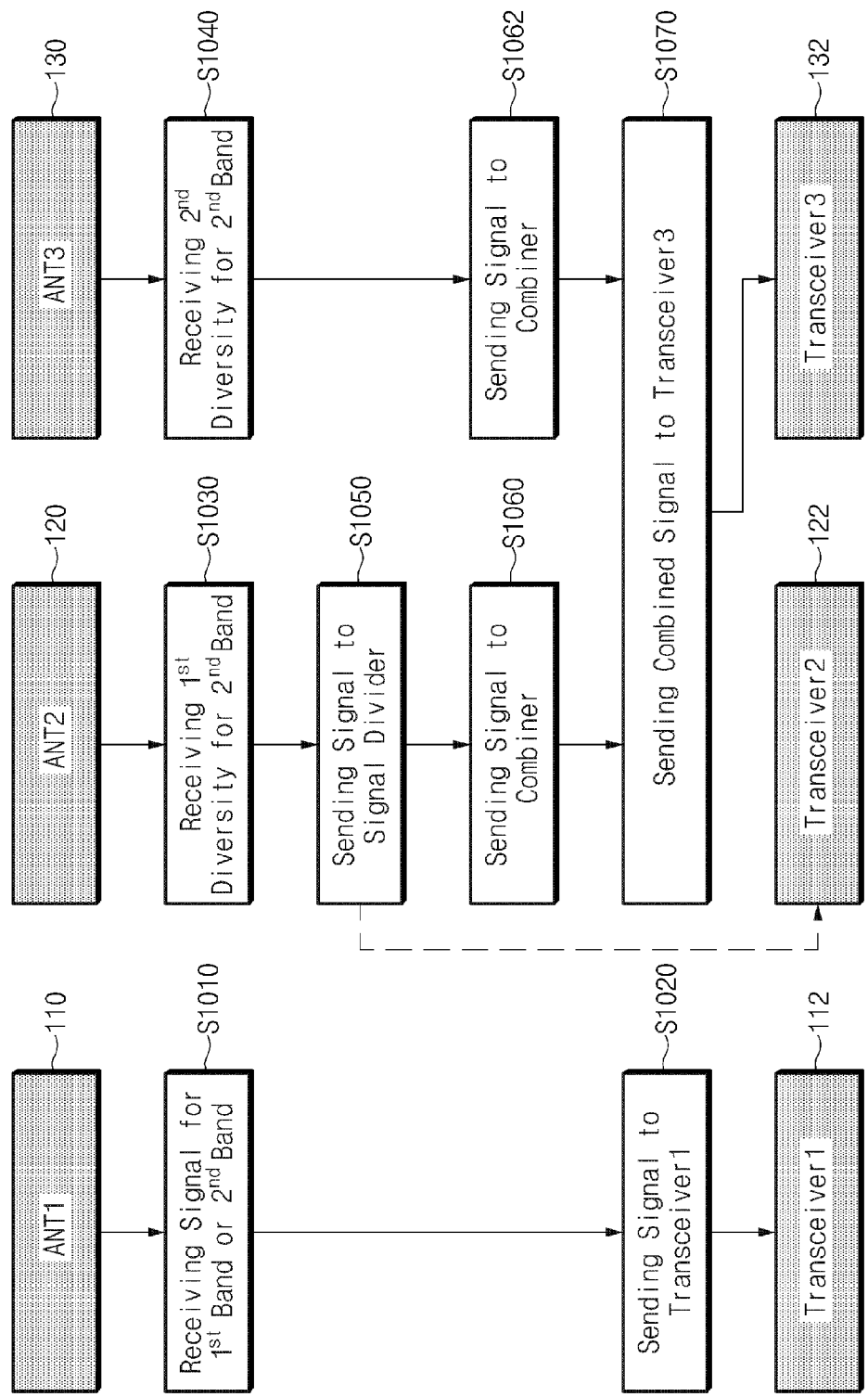
FIG. 10 is a flowchart of a signal processing method of an antenna system according to an embodiment of the present invention.

FIG. 10 is a flowchart of a signal processing method of an antenna system according to an embodiment of the present invention.

Referring to FIG. 10, a signal processing method between the first antenna 110, the second antenna 120, and the third antenna 130, and the respectively corresponding first transceiver 112, second transceiver 122, and third transceiver 132 is shown. That is, FIG. 10 corresponds to a signal processing method by the antenna system shown in FIGS. 2A and 2B.

In step S1010, the first antenna 110 receives a signal of a first or second band and in step S1020, the received signal is sent to the first transceiver 112.

In step S1030, the second antenna 120 receives a first diversity signal for the second band signal. Concurrently, in step S1040, the third antenna 130 receives a second diversity signal for the second band signal. In this case, impedance matching may be performed on the second band of the second antenna by an IMU connected between a signal divider and a combiner.

In step S1050, the first diversity signal received by the second antenna 120 is provided to the signal divider and in step S1060, the signal divider provides the first diversity signal to the combiner. Concurrently, the third antenna 130, in step 1062, provides the second diversity signal to the combiner.

In step S1050, the received signal is provided to the second transceiver 122 and a related example is described below with reference to FIG. 13.

In step S1070, the first diversity signal and the second diversity signal are combined and the combined signal is provided to the third transceiver 132.

Figure 11:
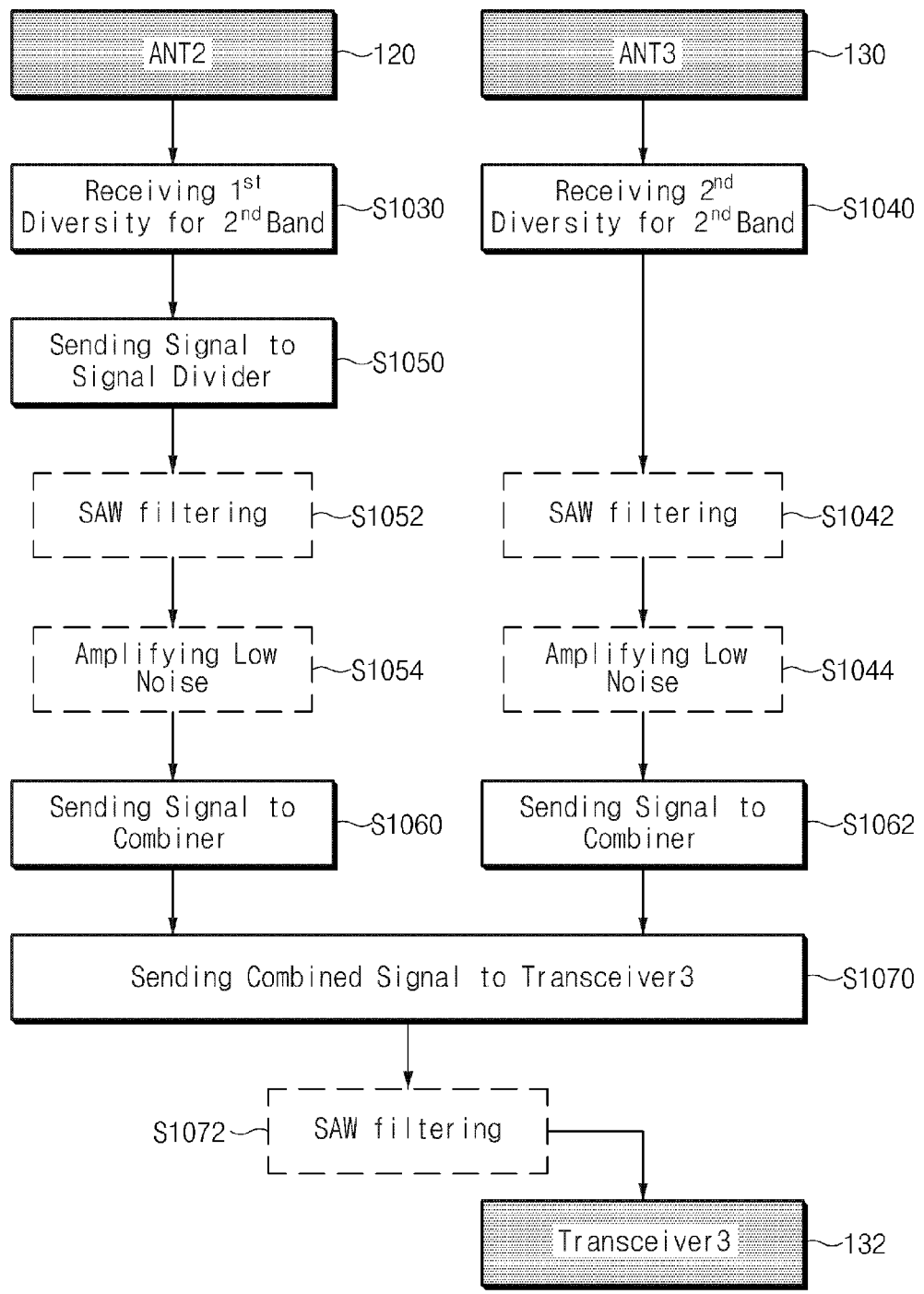
FIG. 11 is a flowchart of a signal processing method of an antenna system according to an embodiment of the present invention.

FIG. 11 is a flowchart of a signal processing method of an antenna system according to an embodiment of the present invention. In relation to the process shown in FIG. 11, a method corresponding to FIG. 10 is omitted.

The operation for providing the first diversity signal to the combiner via the signal divider in the second antenna 120 in step S1050 and step S1060 further includes at least one operation among SAW filtering (in step S1052) and amplifying by a low noise amplifier (in step S1054) with respect to the first diversity signal. For example, only amplifying by a low noise amplifier (in step S1054) is applied to the first diversity signal without SAW filtering (in step S1052).

In step S1062 for the third antenna 130, SAW filtering (in step S1042) and/or amplifying by a low noise amplifier (in step S1044) are applied to an operation for providing the second diversity signal to the combiner.

Additionally, an operation for providing the combined signal to the third transceiver 132 further includes an operation for performing SAW filtering (in step S1072) on the combined signal.

When an LNA for performing amplification is added to the antenna system, the total consumption current is increased by the LNA consumption current (about 10 mA). Additionally, when the second antenna and the third antenna receive diversity signals of the first and second bands, respectively, and it is determined that the second antenna need not receive the diversity signal of the second band to improve the reception sensitivity of the second band, by controlling a signal path connected to the signal divider and the combiner, the increased current consumption due to the LNA may be minimized and the usage of an existing antenna path may be increased. A control process relating to such a method is shown in FIG. 12 and described below.

Figure 12:
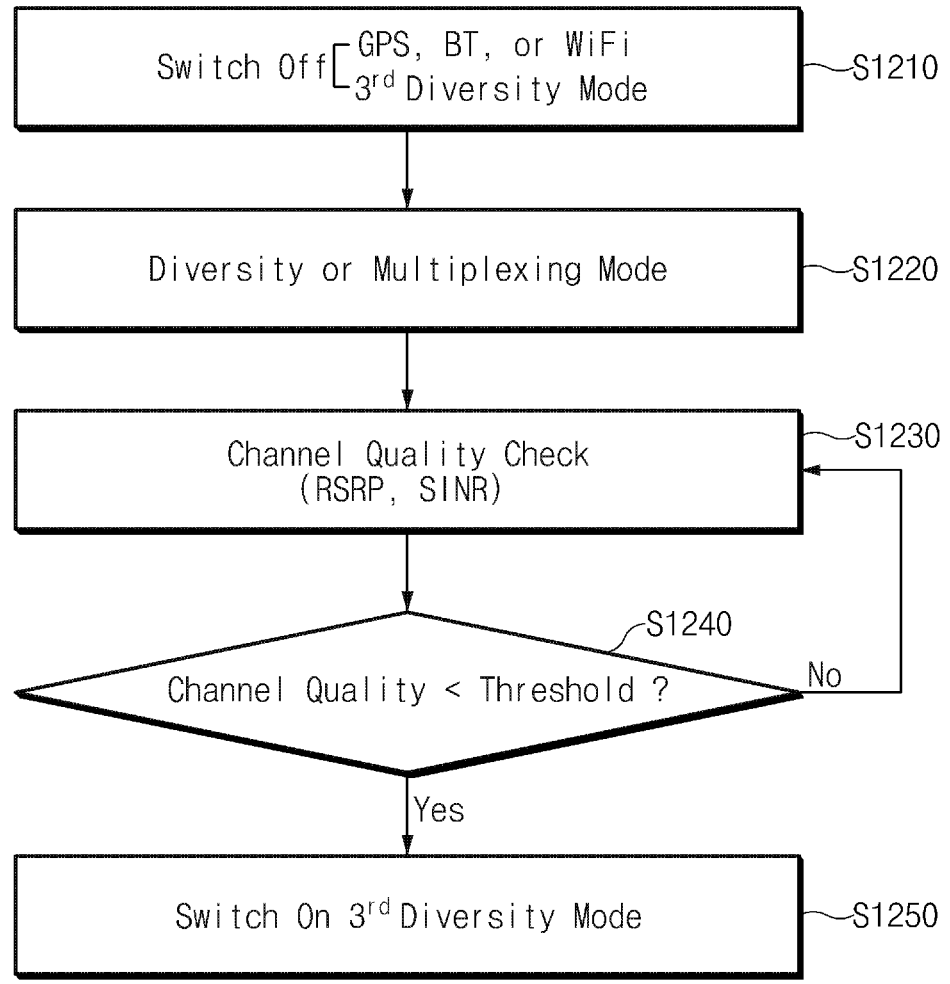
FIG. 12 is a flowchart of a signal processing method of an antenna system according to an embodiment of the present invention.

FIG. 12 is a flowchart of a signal processing method of an antenna system according to another embodiment of the present invention. The process shown in FIG. 12 may be used to determine an operating state of the antenna system. That is, the process of FIG. 12 may precede the process of FIG. 10. If it is determined that a channel quality is greater than a reference value on the basis of the process of FIG. 12, step S1230 is performed repeatedly and the second antenna 120 of FIG. 10 performs the dotted-line process in step S1050 at the same time. That is, when the channel quality is greater than the reference value, the second antenna 120 receives the diversity signal for the first band in step S1030 and transmits the received signal to the signal divider in step S1050. The signal divider transmits this signal to the second transceiver 122 again.

Of course, while the process shown in FIG. 10 is performed, the process of FIG. 12 may be performed continuously. Unless the control process of FIG. 12 is not terminated arbitrarily, as shown in FIG. 12, the quality of a communication channel is determined and based on this result, an operating state of the antenna system is changed.

In step S1210, when a GPS, Bluetooth, or Wi-Fi antenna is used, a third diversity mode (i.e., a mode for receiving a diversity signal of a second band via the second antenna) is in a switched off state. In step S1220, the antenna system operates in a diversity mode (i.e., a basic diversity mode in which the second antenna receives a diversity signal of a first band and the third antenna receives a diversity signal of a second band. This mode is distinguished from a third diversity mode or a multiplexing mode.

In step S1230, the antenna system determines the Reference Signal Received Power (RSRP), Signal to Interference plus Noise Ratio (SINR), and/or Channel Quality Indicator (CQI) value of a diversity signal for a second band signal received by the third antenna.

Herein, the RSRP means an average reception signal intensity of a reference subcarrier received by a Resource Block (RB) unit. The RB is a data transmission unit in LTE communication and is configured with a set of twelve 15 kHz subcarriers. Accordingly, the RB has a bandwidth of 180 kHz. Additionally, the SINR means a ratio of interference to signal intensity and noise intensity sum. Additionally, the CQI, as an index obtained by dividing and indexing the quality state of a wireless communication channel with numbers, means an index used to notify a channel quality state from a terminal to a base station.

When the channel quality is less than the reference value in step S1240, the third diversity mode changes into a switched on state in step S1250. For example, by controlling the signal divider, the second antenna impedance-matches the second band and thus, receives a diversity signal of a second band. A series of processes shown in FIG. 12 may be performed by at least one of the CP and the AP.

Figure 13:
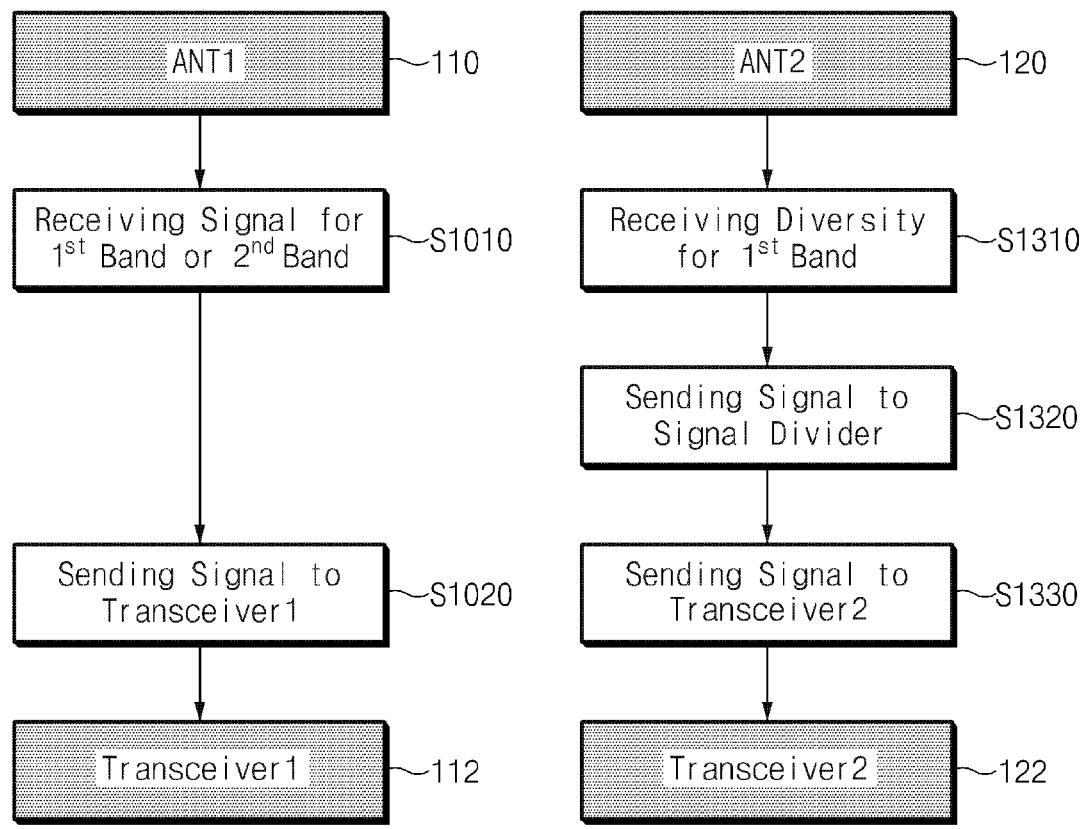
FIG. 13 is a flowchart of a signal processing method of first and second antennas according to an embodiment of the present invention.

FIG. 13 is a view illustrating signal processing of first and second antennas according to an embodiment of the present invention. The process of FIG. 13 may be performed when the third diversity mode is in a switched-off state in FIG. 12.

The first antenna 110 performs an operation corresponding to the process shown in FIG. 10. The second antenna 120 receives a diversity signal for a first band in step S1310. In this case, impedance matching may be performed on the first band signal. An impedance matching unit for impedance matching may be disposed between the second antenna 120 and the signal divider or between the signal divider and the second transceiver 122.

The received diversity signal is transmitted to the signal divider in operation S1320. The signal divider transmits this signal to the second transceiver 122 again.

Table 1 below represents a result measured by realizing a method actually according to an embodiment of the present invention. An initial value is the performance of a typical type terminal and an improvement value is a terminal performance according to an embodiment of the present invention. As an LNA is added, the insertion loss of the combiner is compensated for mostly. Thus, only the conduction sensitivity loss of about 0.2 dB is shown. DRX TIS, i.e., an existing DRX ANT performance, is −83.7 dBm but DRX0 +DRX1 Total Isotropic Sensitivity (TIS), i.e., a combining performance, is about −86.7 dBm. That is, there is an improvement effect of about 3 dB. Since DRX TIS is identical, based on a comparison result of Single Input Single Output/Multi Input Multi Output (SISO/MIMO) performance, SISO TIS has an improvement effect of about 1.2 dB and MIMO TIS has an improvement effect of about 3.1 dB.

TABLE 1

| ANT | Initial value | Improved value | Delta | Remarks |
|---|---|---|---|---|
| DRX | −99.1 | −98.9 | −0.2 | Equivalent |
| PRX TIS | −87.3 | −87.4 | 0.1 | Equivalent |
| DRX0 TIS | −83.7 | −83.4 | −0.3 | Equivalent |
| DRX0 + DRX1 TIS | | −86.7 | 3.0 | Improved |
| SISO TIS | −90.1 | −91.3 | 1.2 | Improved |
| MIMO TIS | −85.6 | −88.7 | 3.1 | Improved |

According to various embodiments of the present invention, when a plurality of bands are used for communication by using a plurality of antennas, the reception sensitivity and radiation performance of an antenna may be improved.

Also, embodiments of the present invention described and shown in the drawings are provided as examples to describe technical content and help understanding but do not limit the scope of the present invention. Accordingly, it should be interpreted that besides the embodiments listed herein, all modifications or modified forms derived based on the technical ideas of the present invention are included in the scope of the present invention as defined in the claims, and their equivalents.

What is claimed is:

1. A method of communicating with a plurality of bands by using an electronic device including a plurality of antennas, the method comprising:
providing a first or second band signal received via a first antenna to a first transceiver;
receiving a first diversity signal for the second band signal via a second antenna and providing the received first diversity signal to a combiner via a signal divider connected to a second transceiver and the combiner;
receiving a second diversity signal for the second band signal via a third antenna and providing the received second diversity signal to the combiner; and
combining the first diversity signal and the second diversity signal in the combiner and providing the combined signal to a third transceiver connected to the third antenna.

2. The method according to claim 1, further comprising performing impedance matching on the second band signal via an Impedance Matching Unit (IMU) connected between the signal divider and the combiner.

3. The method according to claim 1, further comprising;
when the electronic device satisfies a predetermined condition, receiving a diversity signal for the first band signal via the second antenna; and
providing the diversity signal for the first band signal to the second transceiver via the signal divider.

4. The method according to claim 3, further comprising performing impedance matching on the first band signal via an IMU connected between the second antenna and the signal divider or between the signal divider and the second transceiver.

5. The method according to claim 1, wherein providing the received first diversity signal to the combiner via the signal divider comprises performing at least one of Surface Acoustic Wave (SAW) filtering and amplification by a Low Noise Amplifier (LNA) on the first diversity signal.

6. The method according to claim 1, wherein providing the received second diversity signal to the combiner comprises performing at least one of Surface Acoustic Wave (SAW) filtering amplification by a Low Noise Amplifier (LNA) on the second diversity signal.

7. The method according to claim 1, wherein providing the combined signal to the third transceiver further comprises Surface Acoustic Wave (SAW) filtering on the combined signal.

8. The method according to claim 1, wherein providing the received first diversity signal to the combiner via the signal divider is performed when a quality of a reception signal received by the electronic device is less than a predetermined reference.

9. The method according to claim 8, wherein the predetermined reference comprises at least one reference value among Reference Signal Received Power (RSRP), Signal to Interference plus Noise Ratio (SINR), and Channel Quality Indicator (CQI) with respect to the reception signal.

10. An antenna system for an electronic device communicating with a plurality of bands, the antenna system comprising:
a first antenna and a first transceiver configured to receive a first band signal or a second band signal;
a second antenna and a second transceiver configured to receive a first diversity signal for the second band signal;
a third antenna and a third transceiver configured to receive a second diversity signal for the second band;
a signal divider connected between the second antenna and the second transceiver; and
a combiner connected between the third antenna and the third transceiver,
wherein the signal divider is configured to deliver the first diversity signal to the combiner; and
the combiner is configured to combine the first diversity signal and the second diversity signal and provide the combined signal to the third transceiver.

11. The antenna system according to claim 10, further comprising:
- a first impedance matching unit connected between the signal divider and the combiner and configured to perform impedance matching on the second diversity signal; and
- a second impedance matching unit connected between the second antenna and the signal divider or between the signal divider and the second transceiver.

12. The antenna system according to claim 10, wherein when the electronic device satisfies a predetermined condition, the second antenna is further configured to receive a diversity signal for the first band signal, and the signal divider is further configured to provide the received diversity signal for the first band signal to the second transceiver.

13. The antenna system according to claim 10, further comprising at least one of a Surface Acoustic Wave (SAW) filter and a Low Noise Amplifier (LNA) connected between the signal divider and the combiner.

14. The antenna system according to claim 10, further comprising a Surface Acoustic Wave (SAW) filter connected between the combiner and the third transceiver.

15. The antenna system according to claim 10, wherein the signal divider comprises at least one of a switch, a diplexer, a splitter, a di-multiplexer, and a Front End Module (FEM).

* * * * *